US012470026B2

(12) United States Patent
Büttemeyer et al.

(10) Patent No.: US 12,470,026 B2
(45) Date of Patent: Nov. 11, 2025

(54) DATA TRANSMISSION MODULE

(71) Applicant: HARTING Electric Stiftung & Co. KG, Espelkamp (DE)

(72) Inventors: Jana Büttemeyer, Rahden (DE); Heiko Meier, Minden (DE); Finn Timmermann, Espelkamp (DE)

(73) Assignee: HARTING Electric Stiftung & Co. KG, Espelkamp (DE)

( * ) Notice: Subject to any disclaimer, the term of this patent is extended or adjusted under 35 U.S.C. 154(b) by 380 days.

(21) Appl. No.: 18/014,462

(22) PCT Filed: Jun. 28, 2021

(86) PCT No.: PCT/DE2021/100544
§ 371 (c)(1),
(2) Date: Jan. 4, 2023

(87) PCT Pub. No.: WO2022/007994
PCT Pub. Date: Jan. 13, 2022

(65) Prior Publication Data

US 2023/0335955 A1 Oct. 19, 2023

(30) Foreign Application Priority Data

Jul. 6, 2020 (DE) ..................... 10 2020 117 772.0

(51) Int. Cl.
*H01R 13/6592* (2011.01)
*H01R 13/516* (2006.01)
*H01R 13/6463* (2011.01)

(52) U.S. Cl.
CPC ....... *H01R 13/6592* (2013.01); *H01R 13/516* (2013.01); *H01R 13/6463* (2013.01)

(58) Field of Classification Search
CPC .............. H01R 13/6592; H01R 13/516; H01R 13/6463; H01R 9/031; H01R 13/514; H01R 9/223
See application file for complete search history.

(56) References Cited

U.S. PATENT DOCUMENTS 6,190,202 B1 2/2001 Lai
7,172,466 B2 2/2007 Aekins et al.
(Continued)

FOREIGN PATENT DOCUMENTS

DE 202018101278 U1 3/2018
DE 112017005157 T5 6/2019
(Continued)

OTHER PUBLICATIONS

Machine Translation JP 6495218 B2, (Apr. 3, 2019) (Year: 2025).*
(Continued)

*Primary Examiner* — Travis S Chambers
(74) *Attorney, Agent, or Firm* — Smartpat PLC

(57) ABSTRACT

The invention relates to a data transmission module for use in a connector with a modularly configurable supporting frame, said data transmission module being designed for transmitting electrotechnical signals using at least one data cable. The data transmission module also comprises a housing and an insulating body which can be inserted into the housing, the insulating body accommodating at least two contact elements which are each connected to at least one wire of the data cable, and the insulating body accommodating at least one contact carrier which accommodates at least the two contact elements of the data cable.

12 Claims, 2 Drawing Sheets

(56) References Cited

U.S. PATENT DOCUMENTS

| | | | |
|---|---|---|---|
| 7,195,518 | B2 | 3/2007 | Bert et al. |
| 7,445,471 | B1 * | 11/2008 | Scherer ................ H01R 13/518 439/701 |
| 9,667,002 | B1 * | 5/2017 | Martin ............... H01R 13/4223 |
| 10,056,718 | B2 | 8/2018 | Dang et al. |
| 2011/0300750 | A1 | 12/2011 | Nagawatari et al. |
| 2015/0349472 | A1 | 12/2015 | Zebhauser et al. |
| 2018/0026401 | A1 | 1/2018 | Kanda et al. |
| 2019/0199028 | A1 | 6/2019 | Maesoba et al. |
| 2019/0296491 | A1 | 9/2019 | Maesoba et al. |

FOREIGN PATENT DOCUMENTS

| | | | | |
|---|---|---|---|---|
| EP | 3273542 | A1 | 1/2018 | |
| FR | 2805932 | A1 | 9/2001 | |
| JP | 6495218 | B2 * | 4/2019 | ............. H01R 11/11 |
| WO | 2014023383 | A1 | 2/2014 | |

OTHER PUBLICATIONS

Machine Translation DE 202018101278 U1, (Mar. 22, 2018) (Year: 2025).*

Machine Translation FR 2805932 A1, (dated Sep. 7, 2001) (Year: 2025).*

* cited by examiner

DATA TRANSMISSION MODULE

TECHNICAL FIELD

The disclosure relates to a plug connector module.

BACKGROUND

Plug connector modules are used in particular in modular industrial plug connectors or heavy-duty plug connectors in order to transmit data in a high frequency range. The plug connector module proposed here is designed for high data rates and in particular for transmission category 7A. Thus the plug connector module is suitable for use in a 10 GB Ethernet network. The plug connector module according to the invention allows data transmission with an operating frequency of up to 1000 MHz (Megahertz).

Plug connector modules are required as part of a plug connector modular system in order to be able to adapt a plug connector, in particular a heavy-duty industrial plug connector, in versatile fashion to specific requirements with respect to signal and energy transmission, e.g. between two electrical devices. Usually, plug connector modules are for this inserted in corresponding supporting frames, which may also be described as hinged frames, module frames or modular frames. The supporting frames thus serve to receive several plug connector modules of similar and/or also different design, and mount these securely on a surface and/or a device wall and/or in a plug connector housing or similar.

Optimally, supporting frames are used which are formed from two frame parts which are hinged together. The plug connector modules are provided with approximately rectangular holding means protruding from the narrow sides. Recesses designed as openings closed on all sides are provided in the side parts of the frame halves, into which the holding means engage on insertion of the plug connector modules into the supporting frame. To insert the plug connector modules, the supporting frame is hinged open, i.e. opened, wherein the frame halves are opened around the hinge only far enough for the plug connector modules to be inserted. Then the frame halves are closed again, i.e. the supporting frame is closed, wherein the holding means enter the recesses and a secure form-fit retention of the plug connector modules in the supporting frame is achieved.

DE 20 2018 101 278 U1 discloses as the prior art a plug connector module for a modular industrial plug connector which has at least two electrical contact elements and a metallic housing, in which at least three metallic webs are molded that are oriented substantially parallel to one another, wherein the contact elements are arranged on the metallic housing separated from one another by the metallic webs, wherein the metallic housing has an electrically conductive cover which is in touch contact with the metallic webs and connects these together electrically.

The disclosed plug connector module furthermore has an insulating body for receiving the contact elements. This however leads to the disadvantage that make-up of a data cable with more than two wires is difficult, since to maintain the shielding braid of a data cable, as little insulation and shielding braid as absolutely necessary is removed and thus handling and insertion take place with very short wire ends. Here there is need for improvement in order to save time and simplify the make-up.

The German Patent and Trade Mark Office has researched the following prior art in the priority application of the present application: U.S. Pat. No. 6,190,202 B1, 6,190,202 B1, 7,195,518 B2, FR 2,805,932 A1 and U.S. Pat. No. 7,172,466 B2.

SUMMARY

An object of the disclosure is to simplify the make-up or mounting and maintenance of the data transmission module, in particular the make-up of the data cable and the data wires contained therein.

This object is achieved by the subject of the independent claims.

Advantageous embodiments of the invention are indicated in the subclaims and in the following description.

An embodiment of the invention concerns a data transmission module for use in a plug connector with a modularly configurable supporting frame, wherein the data transmission module is designed for transmission of electrotechnical signals by means of at least one data cable. Here, the data transmission module comprises a housing and an insulating body which can be inserted into the housing, wherein the insulating body receives at least two contact elements, wherein the contact elements are each connected to at least one wire of the data cable, wherein the insulating body receives at least one contact carrier, wherein the contact carrier receives at least the two contact elements of the data cable. A data transmission module here is a plug connector module which, with similarly or differently designed modules of the same system, may be accommodated in a supporting frame configured for this in order to be introduced into a plug connector housing, whereby a modular and adaptable plug connector is formed. A data cable is substantially a cable which is designed to transmit at least electrical signals, ideally electronic data. Ideally, at least one shielding element is used to improve the electromagnetic compatibility, for example an electrically conductive sheath made of a braid or film. A contact carrier is an element which is configured to receive contact elements that are connected to corresponding contact elements of a device connection or counter-plug connector. For this, for each contact element to be inserted, a contact carrier has at least one opening and/or passage opening into which the contact element is inserted. Use of this contact carrier allows the shielding elements of the data cable to be left intact over a longer area of the data cable. To insert several wires of at least one data cable into an insulating body requires a certain length of the cable or wires for make-up and mounting. This length may be reduced significantly if the cable can already be prepared on the far side of the insulating body. The longer shielding of the data cable and/or the longer shielding of the wires located therein has an advantageous effect on the electromagnetic compatibility. This improved electromagnetic compatibility in turn allows a higher data transmission rate.

In a further embodiment, the data cable comprises at least one twisted-pair cable, consisting of at least two twisted-pair wires. Such twisted-pair cables are normally used for BUS systems, e.g. ISO-BUS or Ethernet. For this, the wires used are twisted in pairs, which increases the EMC (electromagnetic compatibility), and higher data transmission rates can be achieved than with separately inserted, untwisted wires of a cable. In order to achieve particularly high data transmission rates, these cables are also usually shielded once or multiple times against the environment. In a BUS system having several twisted-pair cables, often the wire pairs are shielded from one another and then again shielded from the environment. When at least two twisted-pair cables are used, the use of at least two contact carriers allows a particularly advantageous use of conventional shielding elements. As already stated, the required length of the wires for make-up and/or mounting is reduced, so a greater length of the shielding element, which would have had to be removed in conventional mounting processes, may remain intact. As a result, higher data transmission rates than in the prior art are already possible.

Therefore a further embodiment is recommended which provides that the at least one contact carrier is made from a substantially flexible plastic. By using a flexible plastic, the contact elements used can be connected to the contact carrier in various ways. The flexible plastic is preferably at least one elastic Duroplastic. Alternatively, a rigid elastomer or stable thermoplastic may be used. The use of rubber-based plastics is also conceivable.

An embodiment is preferred in which the contact carrier receives the contact elements of the data cable by form fit. Suitably, this form-fit connection of the contact elements of the data cable with the contact carrier is achieved in that the contact carrier has at least one latching means which at least hinders a separation of the contact elements from the contact carrier in the direction of the data cable.

Suitable latching means are in particular protrusions which protrude as hooks or wedges into the recess in which the contact element is introduced. Normally, contact elements have a peripherally molded ring form. A latching means can engage behind this ring form so that the contact element is received in the contact carrier and inhibited against separation.

Alternatively, an embodiment provides that the contact elements of the data cable are brought into engagement with the contact carrier, wherein the contact elements have at least one latching means which at least hinders a separation of the contact elements from the contact carrier in the direction of the data cable. Suitable latching means are in particular protrusions which protrude as hooks or wedges from a base body of the contact elements which are introduced into the contact element. In this case, the recesses of the contact carrier may be provided with a peripheral groove or ring extension. A latching means can engage behind this groove or ring extension so that the contact element is received in the contact carrier and inhibited against separation.

In a further embodiment, the contact carrier has at least one latching means which is configured to fix the contact carrier in the insulating body. A suitable latching means is in particular a protrusion which protrudes as a hook or wedge from the contact carrier so that the latching means engages in at least one recess in the insulating body. In this case, recess of the insulating body may be provided with at least one groove corresponding to the latching means, or a corresponding depression. A latching means can engage behind this groove or depression so that the contact carrier is received in the insulating body and inhibited against separation.

In a further alternative embodiment, the insulating body has at least one latching means which is configured to fix the contact carrier in the insulating body. A suitable latching means is in particular a protrusion which protrudes as a hook or wedge into a passage opening of the insulating body, so that the latching means engages in at least one recess in the contact carrier. In this case, the recess of the contact carrier may be provided with at least one groove corresponding to the latching means, or a corresponding depression. A latching means can engage behind this groove or depression so that the contact carrier is received in the insulating body and inhibited against separation.

In one embodiment, the housing of the data transmission module consists of at least two housing elements, wherein a first housing element receives the insulating body by form fit, and a second housing element is fixed to the first housing element by at least one fixing element and thus forms an interior of the housing. Preferably, a housing element is here formed as a base body in which the insulating body is inserted. Accordingly, the second housing element is formed as a lid. Various elements may be used as fixing elements. Preferably, screws are provided as fixing elements. However, latching hooks or similar form-fit or force-fit fixing elements are also conceivable here.

In a preferred embodiment, the housing of the data transmission module is made of an electrically conductive material and thus serves substantially as a shielding element for shielding the at least one twisted-pair cable or the twisted-pair wires contained therein. Both metals, metal alloys and electrically conductive plastics are suitable for use as a housing for the data transmission module. In addition, it may be advantageous to provide the housing at least partially with a particularly conductive substance, in order to improve the shielding against electromagnetic interference at least at the corresponding parts. In this way, particularly high data transmission rates are possible.

BRIEF DESCRIPTION OF THE DRAWINGS

An exemplary embodiment of the invention is illustrated in the drawings and explained in more detail below, in which.

DETAILED DESCRIPTION

The figures contain partially simplified schematic illustrations. For similar but not necessarily identical elements, the same reference signs are used in some cases. Different views of the same elements may have different scales. Directional indications such as “above”, “below”, “left”, “right”, “front” and “rear” refer to the respective illustrations and may vary with respect to the elements illustrated.

Figure 1:
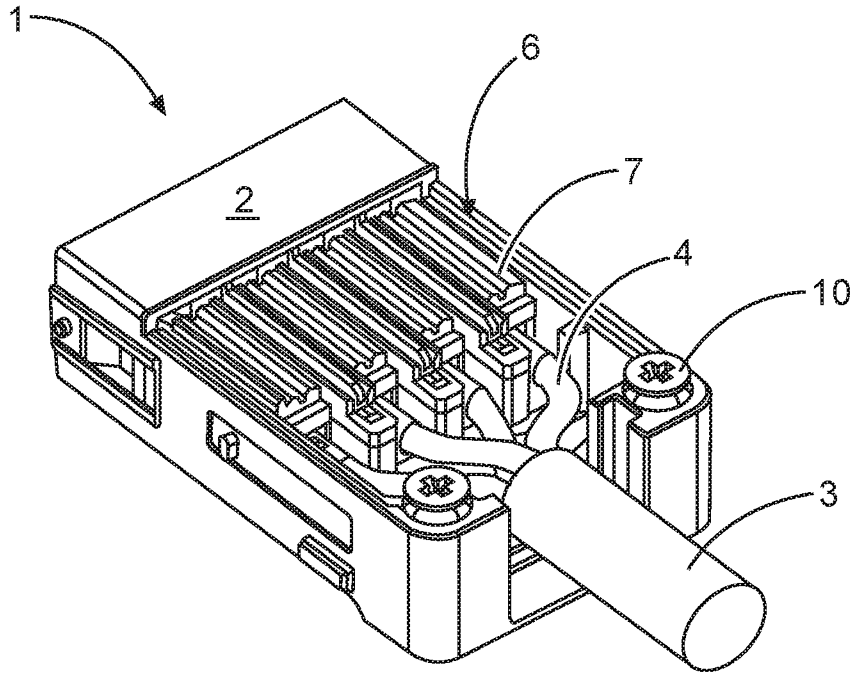
FIG. 1 shows a perspective illustration of a data transmission module.

FIG. 1 shows an isometric illustration of a data transmission module 1 according to the invention. The structure is clear. Firstly, part of the module housing 2 can be seen which receives an end of a data cable 3. In the embodiment illustrated, the data cable 3 consists of four twisted-pair cables 4. These twisted-pair cables 4 each comprise two twisted-pair wires 5. These are particularly clear in FIG. 2. Furthermore, the data transmission module 1 has an insulating body 6. This insulating body 6 may be made in several pieces, for example as a top insulating body element 7 and a lower insulating body element 7' which can be connected thereto. In order to enclose data transmission module 1 completely, a second part of the module housing 2 is connected to the module housing 2 by at least one fixing element 10.

Figure 2:
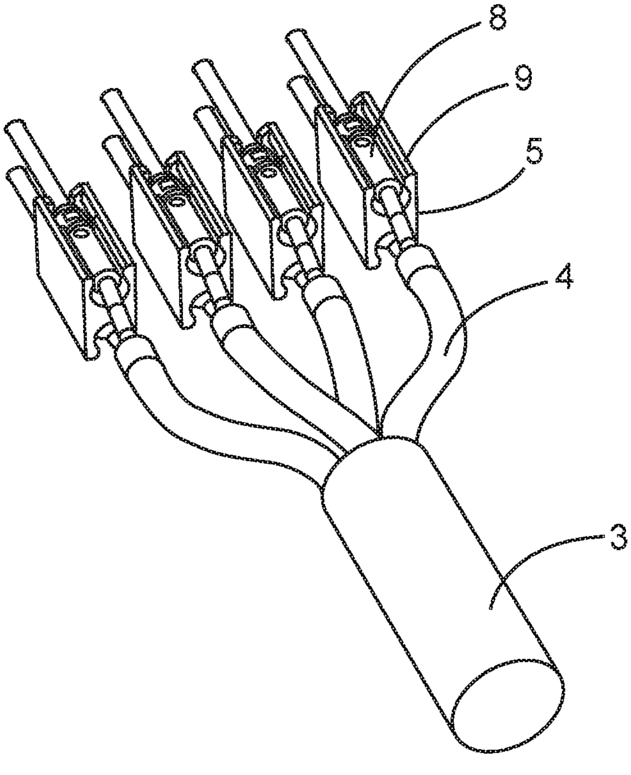
FIG. 2 shows a perspective illustration of a data cable and contact carrier for twisted-pair cables.

A particular advantage of the data transmission module 1 with contact carriers 9 is evident from FIG. 2. In the exemplary embodiment, the data cable 3 comprises four twisted-pair cables 4. The twisted-pair cables 4 each consist of two twisted-pair wires 5. Contact elements 8 are attached to the stripped ends of the twisted-pair wires 5. These elements can easily be inserted in the contact carrier 9 without having to shorten the shielding of the twisted-pair cable 4 and/or the shielding of the twisted-pair wires 5 down to the cable receiver of the module housing 2.

Figure 3:
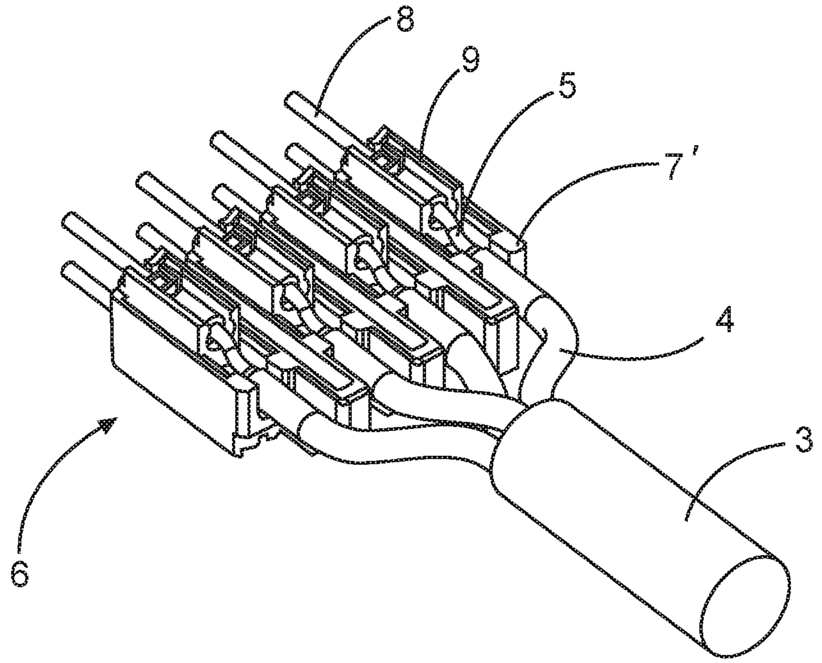
FIG. 3 shows a perspective illustration of a data cable and contact carrier, inserted in one piece of a two-piece insulating body, for twisted-pair cables.

FIG. 3 shows the use of the contact carrier 9 on use of an insulating body 6 consisting of two insulating body elements 7, wherein a lower insulating body element 7' is shown. The contact carriers 9 with contact elements 8 arranged therein are inserted in the insulating body element 7' and there fixed for example to the corresponding insulating body element (not shown). The contact carriers 9 are arranged parallel one another along a width direction of the data transmission module 1. Two contact elements 8 in each of the contact carriers 9 are spaced apart in a height direction of the data transmission module 1.

Figure 4:
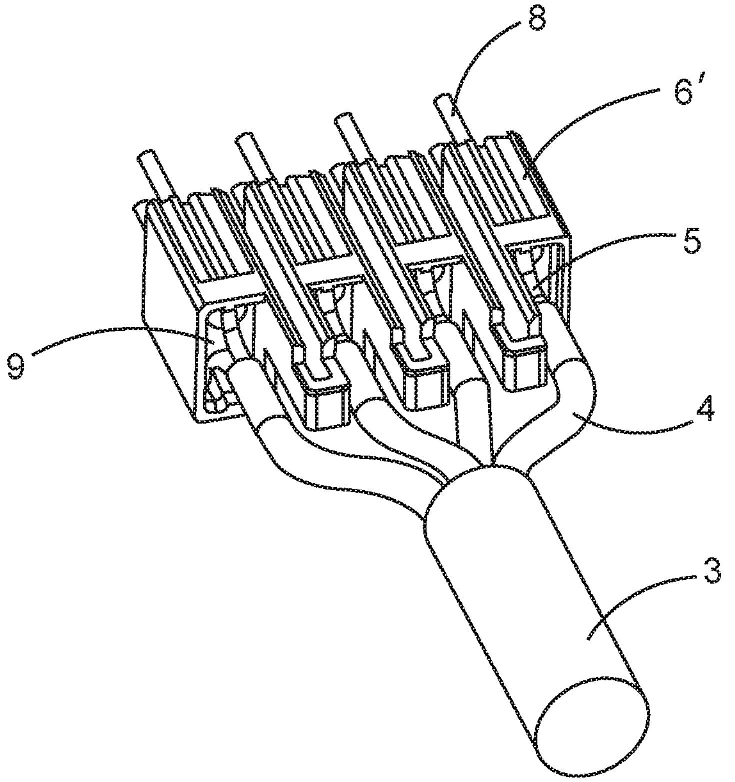
FIG. 4 shows a perspective illustration of a data cable and contact carrier, inserted in a one-piece insulating body, for twisted-pair cables.

An alternative embodiment is shown in FIG. 4, wherein the insulating body 6 is made of one piece. Here, the contact carriers 9 with contact elements 8 arranged therein may be pushed into the insulating body 6. Ideally, latching elements, formed for example as hooks or wedges, ensure that the contact carriers 9 are securely received in the insulating body 6.

Both embodiments of the insulating body 6 shown in FIG. 3 and FIG. 4 serve for illustration and may be configured differently. Advantageously, both designs have recesses between the receiver for the contact carriers, which allow the module housing 2 of the data transmission module 1 to be produced with substantially vertical separating elements, which improves the shielding and hence increases the possible data transmission rates.

Although various aspects or features of the invention are shown in combination in the figures, it is evident to the person skilled in the art—unless indicated otherwise—that the combinations illustrated and discussed are not the only ones possible. In particular, mutually corresponding units or feature complexes from different exemplary embodiments may be exchanged with one another.

LIST OF REFERENCE SIGNS

1 Data transmission module
2 Module housing
3 Data cable
4 Twisted-pair cable
5 Twisted-pair wire
6 Insulating body
7 Insulating body element
8 Contact element
9 Contact carrier
10 Fixing element

The invention claimed is:

1. A data transmission module (1) for use in a plug connector with a modularly configurable supporting frame, comprising:

a housing (2);

an insulating body (6) received in the housing (2);

a plurality of contact carriers (9) received in the insulating body (6); and a plurality of contact elements (8), two of the contact elements (8) being received in each of the contact carriers (9), wherein the data transmission module (1) is designed for transmission of electronic signals through a data cable (3), wherein the contact elements (8) are each connected to a wire of the data cable (3), wherein the data cable (3) is a twisted-pair cable (4) comprising at least two twisted-pair wires (5), and wherein the housing (2) is made of an electrically conductive material and thus serves substantially as a shielding element for shielding the twisted-pair cable (4) or the twisted-pair wires (5) contained therein.

2. The data transmission module (1) as claimed in claim 1, wherein the contact carrier (9) is made from a substantially flexible plastic.

3. The data transmission module (1) as claimed in claim 1, wherein the contact carrier (9) receives the contact elements (8) of the data cable (3) by form fit.

4. The data transmission module (1) as claimed in claim 1, wherein the contact elements (8) of the data cable (3) are brought into engagement with the contact carrier (9), wherein the contact carrier (9) has at least one latching means which at least hinders a separation of the contact elements (8) from the contact carrier (9) in the direction of the data cable (3).

5. The data transmission module (1) as claimed in claim 1, wherein the contact elements (8) of the data cable (3) are brought into engagement with the contact carrier (9), wherein the contact elements (8) have at least one latching means which at least hinders a separation of the contact elements (8) from the contact carrier (9) in the direction of the data cable (3).

6. The data transmission module (1) as claimed in claim 1, wherein the contact carrier (9) has at least one latching means which is configured to fix the contact carrier (9) in the insulating body (6).

7. The data transmission module (1) as claimed in claim 1, wherein the insulating body (6) has at least one latching means which is configured to fix the contact carrier (9) in the insulating body (6).

8. The data transmission module (1) as claimed in claim 1, wherein the plurality of contact carriers (9) are arranged parallel one another along a width direction of the data transmission module (1), and wherein the two contact elements (8) in each of the contact carriers (9) are spaced apart in a height direction of the data transmission module (1).

9. The data transmission module (1) as claimed in claim 8, wherein the insulating body (6) comprises a top insulating body element (7) connected to a lower insulating body element (7').

10. A data transmission module (1) for use in a plug connector with a modularly configurable supporting frame, comprising:

a housing (2);

an insulating body (6) received in the housing (2);

a plurality of contact carriers (9) received in the insulating body (6); and a plurality of contact elements (8), two of the contact elements (8) being received in each of the contact carriers (9), wherein the data transmission module (1) is designed for transmission of electronic signals through a data cable (3), wherein the contact elements (8) are each connected to a wire of the data cable (3), wherein the housing (2) consists of at least two housing elements, wherein a first housing element receives the insulating body (6) by form fit, and a second housing element is fixed to the first housing element by at least one fixing element (10) and thus forms an interior of the housing (6).

11. The data transmission module (1) as claimed in claim 10, wherein the data cable (3) is a twisted-pair cable (4) comprising at least two twisted-pair wires (5).

12. The data transmission module (1) as claimed in claim 11, wherein the housing (2) is made of an electrically conductive material and thus serves substantially as a shielding element for shielding the twisted-pair cable (4) or the twisted-pair wires (5) contained therein.

* * * * *